United States Patent [19]

Breger

[11] 4,418,991

[45] Dec. 6, 1983

[54] PRESBYOPIC CONTACT LENS

[76] Inventor: Joseph L. Breger, 511 Ravine Dr., Highland Park, Ill. 60035

[21] Appl. No.: 157,399

[22] Filed: Jun. 9, 1980

Related U.S. Application Data

[63] Continuation-in-part of Ser. No. 78,462, Sep. 24, 1979, abandoned.

[51] Int. Cl.³ .......................... G02C 7/04; G02C 7/06
[52] U.S. Cl. .................................................... 351/161
[58] Field of Search ............... 351/160 R, 160 H, 161; 51/124 L

[56] References Cited

U.S. PATENT DOCUMENTS

| | | | |
|---|---|---|---|
| Re. 25,286 | 11/1962 | De Carle | 351/161 |
| 3,187,338 | 6/1965 | Neefe | 351/160 R |
| 3,227,507 | 1/1966 | Feinbloom | 351/160 R |
| 3,344,692 | 10/1967 | Volk | 351/160 R |
| 3,482,906 | 12/1969 | Volk | 351/160 R |
| 3,535,825 | 10/1970 | Volk | 351/160 X |
| 3,772,832 | 11/1973 | Smith | 351/160 R |
| 3,950,082 | 4/1976 | Volk | 351/161 X |
| 4,149,801 | 4/1979 | Volk | 356/124 |
| 4,195,919 | 4/1980 | Shelton | 351/167 X |

OTHER PUBLICATIONS

Defazio et al., "Inspection of Back Surface Aspheric Contact Lenses", *Am. J. of Optometry*, vol. 56, No. 8, Aug. 1979, pp. 471–479.

Goldberg, J. B., "Eccentricity Values of Corneal Lenses", *Optometric Weekly*, vol. 67, No. 14, Apr. 1976.

*Primary Examiner*—John K. Corbin
*Assistant Examiner*—Scott J. Sugarman
*Attorney, Agent, or Firm*—Fitch, Even, Tabin & Flannery

[57] ABSTRACT

A contact lens to correct presbyopia provides a distance correction at the center, increasing diopter adds away from the center for close and intermediate viewing and a good physical fit. The lens has a generally spherical anterior surface and a posterior surface with an annular fitting region for good physical fit and an optical region having a central portion providing a distance correction and a paracentral portion providing a gradient of diopter adds for close and intermediate viewing

6 Claims, 5 Drawing Figures

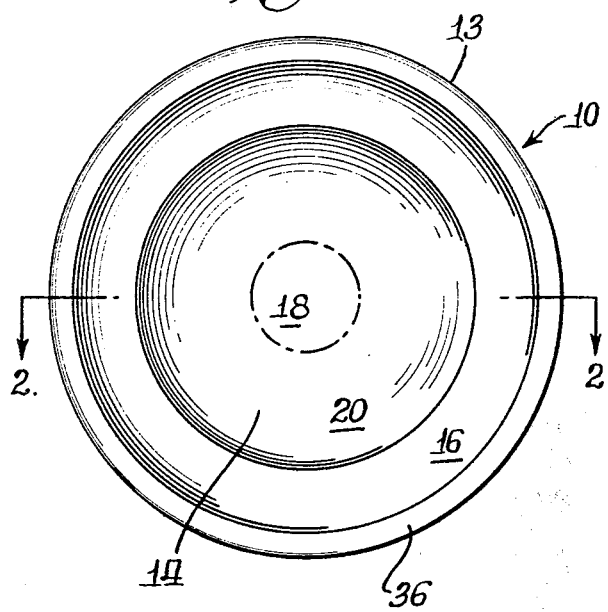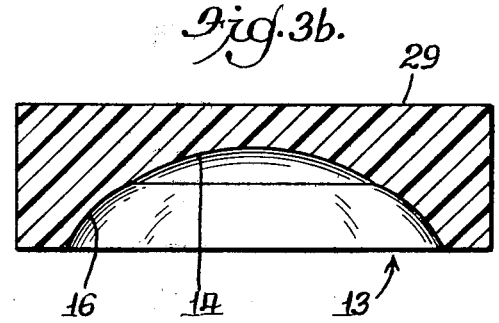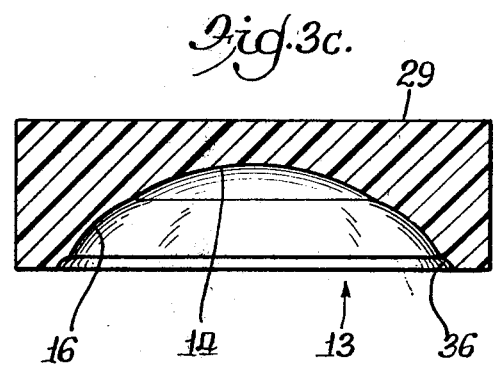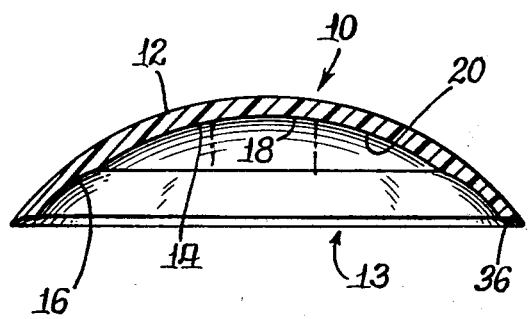

PRESBYOPIC CONTACT LENS

This application is a continuation in part of application Ser. No. 078,462 filed Sept. 24, 1979, now abandoned.

This invention relates to an improvement in contact lens design and more specifically relates to contact lenses designed to correct presbyopia.

BACKGROUND OF THE INVENTION

Contact lenses have been used for the correction of such disorders as myopia, hyperopia, aphakia, and astigmatism. Thus far, contact lenses have been less successful in the treatment of presbyopia, which is a defect of vision associated with advancing age characterized by loss of elasticity of the crystalline lens. The presbyopic patient lacks visual accommodation, i.e., the ability of an eye to adjust to see clearly objects that are close to or at intermediate distances from the eye without the aid of a suitable corrective lens. Presbyopia may begin to occur beginning at age forty.

The common correction for presbyopia is to use bifocal eyeglass lenses which have an upper portion ground for distance viewing, having, most commonly, a correction for myopia or hyperopia, and a lower portion with diopter add for near viewing. This solution is feasible in eyeglasses because the eyeball moves down as the patient looks down, and, therefore, the pupil of the eye moves relative to the lens.

The bifocal solution employed in eyeglasses has not lent itself readily to contact lenses. Contact lenses generally move with the eyeball and this permits contact lenses to be constructed of relatively small size with a diameter which may be slightly larger than the pupillary diameter of the eye or of a size which can extend beyond the cornea and into the scleral area. Bifocal contact lenses have been used which have a thick lower edge which is engaged by the lower eyelid when the patient looks down, causing the contact lens to slide upwards on the cornea relative to the pupil. Such lenses which move relative to the eye are hard to fit because the lens must be sized properly to be engaged by the lower lid. Moreover, the amount of movement of the lens must be accurately measured to determine the desired height of the bifocal segment.

When a patient has pronounced presbyopia, a bifocal lens, whether an eyeglass lens or a contact lens, may not provide a full range of good vision. In addition, if the lack of elasticity of the crystalline lens prevents significant accommodation, a corrective lens with two foci for close and distant viewing may be inadequate for intermediate viewing.

It has been found that contact lenses having spherical anterior surfaces and aspherical posterior surfaces may be advantageously used for the correction of presbyopia. U.S. Pat. No. 3,535,825 describes methods and apparatus for grinding and polishing aspheric contact lenses in the shape of conicoids of revolution. An aspheric posterior surface in the shape of an ellipsoid, a paraboloid, or a hyperboloid is lathe-cut into a contact lens blank by an appropriate cutting tool. The conicoid surface is thereafter polished to optical tolerance by a toroidal-shaped polishing tool, the polishing tool being disposed at an angle to the blank and rotated as the blank is oscillated and rotated thereagainst. Such a conicoid posterior surface, when used in conjunction with a generally spherical anterior surface, results in progressively increasing diopter add away from the center of the lens. Despite the loss of focusing ability of the lens of the eye in presbyopic patients, the eye maintains the ability to focus through that part of the contact lens most appropriate for viewing an object at a particular distance, and thus a contact lens having varying diopter power will permit visual accommodation by a presbyopic patient.

An aspheric surface of a contact lens may be described in terms of its radii of curvature and its eccentricities. In a truly spherical surface, of course, all points thereon have the same radius of curvature and zero eccentricity. For an aspheric surface the term "radius of curvature" refers to the apparent radius of curvature along the meridian at a selected point on the surface. Apparent radii of curvature may be measured at any point on the surface of the lens by instruments such as a keratometer or preferably by a "Radiuscope", sold by American Optical Company.

Eccentricity is a measure of asphericity of a surface. In strict geometric terms, eccentricity is used to describe conic sections such as ellipses, parabolas, and hyperbolas and is the ratio of the distance from any point on the conic section to a focus and the corresponding directrix. A circle has an eccentricity of 0; an ellipse has an eccentricity of less than 1; a parabola has an eccentricity of 1; and a hyperbola has an eccentricity of greater than 1.

A conicoid of revolution is a conic section which has been rotated around its major axis. For a conicoid of revolution, at points away from the center it is possible to measure an apparent meridian radius of curvature and an apparent transmeridian radius of curvature and calculate the eccentricity therefrom, using the methods and apparatus described in U.S. Pat. No. 4,149,801. The eccentricity of the conicoid of revolution may be calculated from the formula:

$$\epsilon = \frac{\sqrt{1 - R_t/R_m}}{\sin\theta}$$

where:
$\epsilon$ is the eccentricity,
$R_m$ is the meridian radius,
$R_t$ is the trans-meridian radius; and
$\theta$ is the angular distance from the center of the center of the point at which the apparent radii are measured. (The angle $\theta$ as used herein is actually the angle which the lens holder is displaced from horizontal for Radiuscopic examination according to the methods of U.S. Pat. No. 4,149,801. Technically, it is imprecise to describe an angle away from the center of a nonspherical surface, but the angle of the lens holder is a good approximation for surfaces having radii of curvatures of from about 6.5 to about 8.5).

While contact lenses have often been described in terms of conicoids of revolution, such shapes are idealized surfaces which may be only approximated in actual practice. Accordingly, the term radius of curvature as used herein will be used to describe the apparent meridian radius of curvature at any point, and eccentricity as used herein will refer to the apparent eccentricity at any point as calculated from the apparent meridian radius and from the apparent trans-meridian radius.

A presbyopic patient typically needs about 2.50 additional diopters for close reading than for normal distant viewing. For example, a nearsighted (myopic) person with presbyopia might be fitted with bifocal eyeglasses having an upper portion ground to give a −6.00 diopter correction and a lower portion ground to give a −3.50 diopter correction. A farsighted person may have bifocals with an upper portion ground to a +4.00 diopter correction and a lower portion ground to a +6.50 diopter correction.

In order to achieve the necessary diopter add in contact lenses for presbyopic patients, it has been necessary to use hyperbolic posterior surfaces. Up to a 4.50 diopter variation has been achieved over the viewing area of a contact lens having a spherical anterior surface and a hyperbolic posterior surface, and such lenses have been used in the treatment of presbyopia. While such lenses have provided presbyopic patients with good near, intermediate, and far vision, lenses having hyperbolic posterior surfaces have been less than successful in providing a good optical fit. The adhesion of contact lenses to the cornea requires that the surface tension created by tears hold the contact lens to the corneal surface and, for acceptable comfort, the edges and peripheral portions of the contact lens should be more or less parallel to the cornea. Good edge and peripheral position cannot be established if the posterior surface of the contact lens is flatter than the cornea, i.e., if the edge of the posterior surface stands off from the cornea due to its greater eccentricity. As the surface of the cornea is generally elliptical, hyperbolic lens surfaces, being flatter than the cornea, provide a good fit.

It is a primary object of the present invention to provide a contact lens which will correct for presbyopia and have both a good optical fit and a good physical fit.

BRIEF DESCRIPTION OF THE DRAWINGS

FIG. 1 is a plan view of the posterior side of a contact lens embodying various features of the present invention.

FIG. 2 is a cross-sectional view of the contact lens shown in FIG. 1 taken along line 2—2 of FIG. 1.

FIG. 3a is a cross-sectional view of a contact lens button having a spherical posterior surface.

FIG. 3b is a cross-sectional view of the posterior surface of the button of FIG. 3a into which an aspheric viewing surface has been polished.

FIG. 3c is a cross-sectional view of the posterior surface of the button of FIG. 3b in which a bevel has been ground into the periphery.

The figures are not drawn to scale and in order that the invention may be better understood, surface curvatures are exaggerated.

Illustrated in FIG. 1 is a contact lens 10 used in the treatment of presbyopia. The lens 10 has a spherical anterior surface 12 (FIG. 2) and a posterior surface 13 having an aspherical optical area 14 with an annular fitting portion 16 therearound. A central portion 18 of the optical area cooperates with the anterior surface 12 to provide an appropriate diopter correction for distance vision. A paracentral portion 20, around the central portion 18, has increasing radii of curvatures away from the center and cooperates with the anterior surface 12 to provide a gradient of appropriate diopter add for close-in and intermediate vision.

Posterior hyperbolic surfaces generated by the methods of U.S. Pat. No. 3,535,825 in which a hyperbolic concave surface is formed by lathe-cutting a lens blank and thereafter polishing the blank with a toroidal polishing tool, results in lenses which, though not precisely hyperbolic, have a central portion which provides a distance correction and a gradient of diopter adds outward from the center. The shape of the fitting portion of the posterior surfaces of such hyperbolic lenses have a greater eccentricity and are thus flatter than the paracentral cornea over which the fitting area lies.

The posterior surface of the presbyopic lens described herein, in addition to having a central portion 18, which provides a distance correction, and a paracentral portion 20, which provides a gradient of diopter adds outward from the center, has a fitting portion 16 which closely parallels the eye to provide a good physical fit. These results are achieved by generating a contact lens button 29 (FIG. 3a) with a spherical posterior surface 30 and polishing the button from the center outward with a toroidal polishing tool of the type described in U.S. Pat. No. 3,535,825. The resulting polished optical area 14 (FIG. 3b) is aspherical, although it cannot be correctly described as a conicoid of revolution. Nevertheless, the generated optical area 14 of the posterior surface functions optically similarly to those surfaces which more closely resemble conicoids of revolution in that the central portion 18 provides a distance correction and diopter add is achieved away from the center in the paracentral portion 20.

To generate the posterior surface 13, the spherical contact lens button 29 is selected with a radius of curvature which closely matches the radius of curvature of the portion of the cornea over which the fitting portion 16 is to lie. Radii of curvature of the cornea may be measured by a keratometer. A toroidal polishing tool is selected which has a transcrescence, i.e., the difference between its equatorial radius and trans-equatorial radius, of between about 2½ mm and about 3½ mm. Both the equatorial radius and trans-equatorial radius of the tool are less than the radius of curvature of the button 29 so that the tool may contact the center of the spherical concave surface 30, the equatorial radius of curvature of the tool being from about 6 mm to about 7½ mm, and the trans-equatorial radius of curvature being between about 2½ mm to about 3½ mm less. A polishing pad to which a wet abrasive has been applied is secured to the surface at the polishing tool. With the axis of the polishing tool disposed relative to the axis of the button at an angle of between about 30° and about 55°, the tool is rotated as the button 29 is oscillated and rotated theragainst, and polishing begins generally at the button center and spreads outward therefrom. The polishing is continued sufficiently long, to polish in the aspherical optical area 14 of the posterior surface 13, but is discontinued before the polishing reaches the peripheral portions of the spherical surface 30 to leave an annular fitting portion 16 substantially untouched.

In an indoor situation, the pupil of the eye has a diameter of about 4 mm to about 5 mm. Allowing for some slippage of the lens relative to the eye, the area of the lens through which the patient views is generally between about 4 mm to about 5½ mm at the center, or about 16° to about 20° from the center of the lens. Accordingly, an optical area 14, about 4 mm to about 5½ mm in diameter, as measured along a perpendicular to axis of the lens, is polished into the lens button 29.

The central portion 18 of the viewing area 14, extending to about 4 or 5 degrees, or from about 1 mm to about 1.2 mm from the center, has a generally uniform radius of curvature throughout. This is not to say that the central portion 18 is strictly spherical, although it may appear to be so using commercially available instrumentation. It does, however, approximate sphericity in that the central portion functions optically generally as a spherical surface, and cooperates with the anterior surface 12 to provide the appropriate distance correction.

The remaining annular paracentral portion 20 of the optical area 14 beyond the central portion 18 provides the diopter add needed for the presbyopic patient to accommodate for near and intermediate viewing. In the paracentral portion 18, the increasing radii of curvature away from the center results in a gradient of increasing diopter add away from the center. At a particular distance from the center, well within the optical area 14, sufficient diopter add is achieved to enable the presbiopic patient to read comfortably, and at intermediate distances from the center, a continuum of foci are provided so that the patient may comfortably view objects at any intermediate distance from the eye. The gradient of diopter add provided by the paracentral portion 20 is achieved by a continual flattening of the paracentral area away from the center. Alternately stated, the radii of curvature in the paracentral portion 20 increase continuously away from the center.

Typically, a presbyopic patient will require a diopter add of from about 0.5 to about 3.5 in addition to the distance correction. To achieve the required diopter add well within the viewing area 14, the paracentral portion 20 must quickly flatten out beyond the central portion 18. To achieve the necessary flattening within a sufficiently small diameter, the paracentral portion has eccentricities within the hyperbolic range, i.e., greater than 1. Sufficient diopter add is achieved in the paracentral portion of presbyopic contact lenses where the eccentricities between about 5° and about 12° from the center are greater than 1.

In the lenses 10 provided by the invention, in which the polishing of a spherical surface 30 begins at the center and spreads outward therefrom, the outer regions receive less polishing than the inner regions and, thus, in the paracentral portion 20 of the viewing area 14, the eccentricity values decrease away from the center. Nevertheless, because the polishing tool has radii of curvature less than the initial spherical posterior surface 30, the radii of curvature of the posterior lens surface 13 increases from the center, which most closely matches the equatorial radius of the tool, outward up to the radius of curvature of the original spherical surface 30. Accordingly, through the paracentral portion 20, a gradient of increasing diopter add is achieved.

Beyond the paracentral portion 20, an annular fitting portion 16 remains which is substantially untouched by the polishing tool. Beginning at about 16° to about 20° from the center, the eccentricity drops below about 0.6 and may drop to 0 (spherical) in those regions completely untouched by the polishing tool. Because the radius of curvature of the original spherical surface 30 is selected to closely match the radius of curvature of the portion of the cornea over which the fitting portion 16 lies, the fitting portion, which remains after polishing in the optical area 14, closely parallels the corneal surface. Actually, the fitting portion 16 turns slightly inward to the eye since the eccentricity of the cornea is typically about 0.6 and the eccentricity at the outer edge of the fitting portion is generally less than 0.6. This slight inward turn, however, is acceptably small and, in fact, is advantageous in that it aids in maintaining the layer of tear fluid between the lens 10 and the eye which holds the lens in place.

To aid the passage of tears under the lens 10, a bevel or peripheral curve 36, which is flared slightly away from the eye, is ground into the periphery of the posterior surface 13 (FIG. 3c). In order that the lens 10 be held securely to the eye, the remaining fitting portion 16 is at least about 0.7 mm wide and preferably greater than about 1.0 mm wide. A gradual flaring may be achieved in a bevel having concentric annular bevel segments, the radii of curvature of each segment being greater than its inwardly adjacent bevel segment.

After the posterior surface 13 is formed, the anterior surface 12 is cut and polished to complete the lens 10. The radius of curvature of the anterior surface 12 will be selected to optically cooperate with the central portion 18 to provide the required distance correction. A gradient of diopter add will be achieved away from the center by the cooperation of the anterior surface 12 with the paracentral portion 20 of the posterior surface 13.

The contact lens 10 may be made of any suitable material of which contact lenses are made. Generally, contact lenses are made of hard or soft plastic. Plastics used for lenses should be nonallergenic and nontoxic to the eye, resistant to scratching and breaking, clear and not discolorable over extended periods of time. Government-approved materials for hard contact lenses presently include polymethyl methacrylate, cellulose acetylbutyrate, a combination of polymethyl methacrylate and silicone. Governmental approval is being sought for hard silicone rubber and, if approved, may be used to make presbyopic contact lenses. However, the invention is not intended to be limited to currently available plastics and the lenses herein described may be made of any material which is later discovered or approved.

Contact lenses for the correction of presbyopia may also be soft lenses providing that an aspherical surface can be maintained on the posterior thereof. Soft contact lenses are commonly made from hydrophilic gel-like plastics which absorb water to varying degrees. At the present state of development of soft lenses, soft lenses with up to about 40 percent water content may retain a suitable aspherical surface. For mild cases of presbyopia where little asphericity must be maintained, a lens with even greater water affinity, i.e., up to 80 percent, may be used. Thicker lenses are better able to maintain their shape with higher water content than thin lenses. Soft contact lenses may also be made of soft silicone rubber or other polymeric material. However, the contact lenses herein described are not intended to be limited to the present state of the art of plastics and are intended to include contact lenses, soft, semisoft, semihard or hard, of whatever material they are made. The invention is intended to include contact lenses with surfaces generated by grinding, polishing, lathe cutting, spinning, or molding.

EXAMPLE I

A patient is found to be nearsighted and presbyopic. It is determined that the patient requires a −6.00 diopter correction for distance viewing, and, because the lens of the patient's eye lacks the ability to adjust, he needs a 2.50 diopter add for reading. A keratometer measurement 3.5 mm from the center of the pupil indicates that the paracentral cornea has a base radius of curvature of 7.60 mm.

A polymethyl methacrylate blank for an 8.8 mm diameter contact lenses is polished to have a spherical posterior surface with a 7.60 mm radius of curvature.

The polished blank is then further polished with a toroidal polishing tool having an equatorial radius of 6.5 mm and a trans-equatorial radius of 4 mm. Beginning at the center of the posterior surface, an optical area is polished into the previously spherical surface for a sufficient period to achieve an aspherical surface with the radii of curvature and eccentricities listed in Table 1. The posterior surface is examined with a Radiuscope to determine the radius of curvature and eccentricities at varying points away from the center. The results are listed in the following table:

TABLE I

| θ | r | ε |
|---|---|---|
| 1° | 6.92 | * |
| 2° | 6.92 | * |
| 3° | 6.92 | * |
| 4° | 6.94 | * |
| 5° | 6.98 | 3.73 |
| 6° | 7.08 | 3.09 |
| 7° | 7.20 | 2.51 |
| 8° | 7.22 | 2.22 |
| 9° | 7.26 | 1.94 |
| 10° | 7.28 | 1.69 |
| 11° | 7.30 | 1.43 |
| 12° | 7.38 | 1.30 |
| 13° | 7.40 | 1.12 |
| 14° | 7.42 | 0.98 |
| 15° | 7.46 | 0.84 |
| 16° | 7.48 | 0.72 |
| 17° | 7.50 | 0.63 |
| 18° | 7.50 | 0.48 |
| 19° | 7.52 | 0.47 |
| 20° | 7.54 | 0.37 |

* = not measurable by present instrument
θ = angle from the center
r = radius of curvature
ε = eccentricity A 0.7 mm wide bevel is ground into the periphery of the posterior surface. By standard optical calculations it is determined that an anterior surface with a radius of curvature of 7.60 mm will cooperate with the 6.90 mm radius of curvature of the central portion of the posterior surface to provide the −6.00 diopter correction and such an anterior surface is subsequently provided. The required 2.50 diopter add is achieved 14° from the center.

EXAMPLE II

The following table compares posterior surfaces of blanks for presbyopic lenses, in which spherical blanks are polished with toroidal polishing tools according to the present invention (Lenses 1–3), with prior lenses, in which lathe-cut hyperbolic surfaces are polished with toroidal polishing tools (Lenses 4–6):

TABLE 2

|  | Lens 1 | | Lens 2 | | Lens 3 | | Lens 4 | | Lens 5 | | Lens 6 | |
|---|---|---|---|---|---|---|---|---|---|---|---|---|
|  | r | ε | r | ε | r | ε | r | ε | r | ε | r | ε |
| 1° | 7.64 | * | 6.56 | * | 7.32 | * | 6.88 | * | 7.18 | * | 6.44 | * |
| 2° | 7.64 | * | 6.56 | * | 7.32 | * | 6.88 | * | 7.18 | * | 6.44 | * |
| 3° | 7.68 | * | 6.60 | * | 7.32 | * | 6.88 | * | 7.18 | * | 6.44 | * |
| 4° | 7.70 | * | 6.60 | * | 7.33 | * | 6.88 | * | 7.20 | * | 6.46 | * |
| 5° | 7.70 | * | 6.76 | 3.82 | 7.54 | 3.68 | 6.94 | 3.38 | 7.31 | 2.26 | 6.50 | 2.64 |
| 6° | 7.74 | 2.56 | 6.80 | 3.17 | 7.56 | 3.07 | 7.10 | 2.82 | 7.34 | 2.07 | 6.56 | 1.98 |
| 7° | 7.84 | 2.44 | 6.80 | 3.07 | 7.60 | 2.67 | 7.18 | 2.31 | 7.36 | 1.78 | 6.60 | 2.19 |
| 8° | 7.86 | 2.23 | 6.90 | 2.56 | 7.70 | 2.32 | 7.20 | 2.14 | 7.40 | 1.81 | 6.62 | 2.16 |
| 9° | 7.86 | 2.09 | 6.90 | 2.31 | 7.80 | 2.00 | 7.26 | 2.11 | 7.46 | 1.67 | 6.66 | 1.90 |
| 10° | 7.90 | 1.88 | 6.96 | 2.04 | 7.90 | 1.69 | 7.30 | 1.65 | 7.50 | 1.57 | 6.70 | 1.77 |
| 11° | 7.96 | 1.65 | 7.12 | 1.63 | 7.90 | 1.43 | 7.40 | 1.41 | 7.58 | 1.45 | 6.74 | 1.67 |
| 12° | 8.10 | 1.36 | 7.12 | 1.48 | 7.90 | 1.36 | 7.42 | 1.30 | 7.60 | 1.40 | 6.78 | 1.53 |
| 13° | 8.20 | 1.20 | 7.14 | 1.26 | 8.02 | 1.21 | 7.44 | 1.20 | 7.62 | 1.35 | 6.86 | 1.39 |
| 14° | 8.20 | 1.04 | 7.18 | 1.09 | 8.10 | 0.83 | 7.46 | 1.15 | 7.64 | 1.32 | 6.92 | 1.25 |
| 15° | 8.20 | 0.90 | 7.26 | 0.89 | 8.10 | 0.73 | 7.50 | 1.13 | 7.70 | 1.25 | 6.98 | 1.15 |
| 16° | 8.20 | 0.78 | 7.26 | 0.77 | 8.08 | 0.67 | 7.52 | 1.11 | 7.80 | 1.17 | 7.04 | 1.11 |
| 17° | 8.20 | 0.68 | 7.28 | 0.66 | 8.08 | 0.56 | 7.54 | 1.10 | 7.82 | 1.21 | 7.10 | 1.13 |
| 18° | 8.23 | 0.56 | 7.24 | 0.63 | 8.08 | 0.51 | 7.56 | 1.13 | 7.88 | 1.20 | 7.16 | 1.13 |
| 19° | 8.24 | 0.43 | 7.30 | 0.50 | 8.08 | 0.49 | 7.60 | 1.14 | 7.90 | 1.16 | 7.20 | 1.07 |
| 20° | 8.26 | 0.36 | 7.34 | 0.38 | 8.06 | 0.43 | 7.70 | 1.08 | 8.00 | 1.13 | 7.26 | 1.10 |

* = not measurable by present instruments

It may readily be seen from the above table that the lenses of the present invention differ substantially from the prior art lenses in the outer regions. While the eccentricities of the prior art lenses at 20° from the center are all over 1.0 as is to be expected for surfaces lathe-cut to a hyperboloid configuration, the eccentricities of the lenses of the invention at 20° are slightly elliptical.

A further advantage of the present lenses over the prior art lenses is that the present lenses are generally lighter and thus are more easily maintained in position on the eye. In presbyopic lenses in which the anterior surface is ground to meet the edges of the relatively flat hyperbolic surface, the center of the lens is quite thick. In the present lens, in which the aspheric optical area is ground into a spherical posterior surface, the anterior surface is ground to meet the edges of the spherical fitting portion, and the center of the lense is relatively thin.

Accordingly, the contact lenses and method of producing them described herein represent a significant improvement over other attempts to provide contact lenses to correct presbyopia. The prior art contact lenses for presbyopia have often been unsatisfactory because the standoff resulting from the flat outer area of the lenses, as well as excessive weight, has provided poor physical fit. The failure rate of such lenses as determined by their return rate, which has been over 60% and in some cases as high as 80 or 90%, has been unacceptably high. The present invention involves a longstanding problem. Providing the aspherical optical area in the posterior surface while leaving an annular fitting portion substantially untouched has resulted in presbyopic lenses with good fit.

Although the invention has been described with regard to a preferred embodiment, it should be understood that the scope of the invention is defined in the appended claims.

Various features of the invention are set forth in the following claims:

What is claimed is:

1. A contact lens for correction of presbyopia having a generally spherical anterior surface; and a posterior side including an annular spherical surface which is an outer residual portion of a spherical base curve generally matched in radius of curvature to a portion of the cornea over which said spherical surface lies and a central generated aspherical surface extending from the center of said posterior side substantially beyond the diameter of the pupil, said generated surface being generated into said base curve by a continuous operation beginning at the center of the original base curve removing continuously less material from the center outward, said generated surface having a central portion which optically cooperates with said anterior surface to provide an appropriate diopter correction for distance vision; and a paracentral portion of said generated aspherical surface around said central portion having progressively increasing radii of curvature and decreasing eccentricities away from the center, said paracentral portion cooperating with said anterior surface to provide a gradient of appropriate diopter add for close-in and intermediate viewing;

said annular spherical surface and a portion of said generated polished surface beyond said paracentral portion fitting closely adjacent the cornea.

2. A contact lens in accordance with claim 1 wherein said generated surface beyond about 16° to about 20° from the center of said lens has eccentricity values below about 0.6.

3. A contact lens in accordance with claim 1 wherein a portion of said paracentral portion from about 5° to about 12° from the center of said lens has eccentricity values greater than about 1.0.

4. A contact lens in accordance with claim 1 wherein said annular spherical surface is at least about 0.7 mm wide.

5. A contact lens for correction of presbyopia having;

a generally spherical anterior surface; and a posterior surface having;

a central portion extending from about 3° to about 5° from the center of said lens which optically cooperates with said anterior surface to provide an appropriate diopter correction for distance vision;

a paracentral portion disposed beyond said central portion and extending at about 16° to about 20° from the center of said lens, said paracentral portion having increasing radii of curvature and decreasing eccentricities away from the center and which optically cooperates with said anterior surface to provide a gradient of appropriate diopter add for close-in and intermediate viewing, that portion of said paracentral portion between about 5° and about 12° from the center of said lens having eccentricities greater than 1; and an annular fitting portion beyond said paracentral portion which generally parallels the corneal surface over which it lies, said fitting portion having eccentricity values below about 0.6.

6. A contact lens in accordance with claim 5 wherein said fitting portion includes an annulus at least about 0.7 mm wide having a spherical configuration.

* * * * *

UNITED STATES PATENT AND TRADEMARK OFFICE
CERTIFICATE OF CORRECTION

PATENT NO. : 4,418,991
DATED : December 6, 1983
INVENTOR(S) : Joseph L. Breger

It is certified that error appears in the above-identified patent and that said Letters Patent is hereby corrected as shown below:

Column 3, line 29, change "good" to --poor--;

Column 8, line 60, change "involves" to --solves--.

Signed and Sealed this

Tenth Day of April 1984

[SEAL]

Attest:

GERALD J. MOSSINGHOFF

Attesting Officer   Commissioner of Patents and Trademarks

UNITED STATES PATENT AND TRADEMARK OFFICE
CERTIFICATE OF CORRECTION

PATENT NO. : 4,418,991

DATED : December 6, 1983

INVENTOR(S) : Joseph L. Breger

It is certified that error appears in the above-identified patent and that said Letters Patent is hereby corrected as shown below:

Column 3, line 18, change "optical" to --physical--;

Column 8, line 48, change "lense" to --lens--.

Signed and Sealed this

Fifteenth Day of May 1984

[SEAL]

Attest:

GERALD J. MOSSINGHOFF

Attesting Officer    Commissioner of Patents and Trademarks